(12) United States Patent
Davenport et al.

(10) Patent No.: US 7,123,165 B2
(45) Date of Patent: Oct. 17, 2006

(54) APPARATUS AND METHOD FOR MONITORING THE OUTPUT OF A WARNING OR INDICATOR LIGHT

(75) Inventors: David Michael Davenport, Niskayuna, NY (US); Mark Marshall Meyers, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 113 days.

(21) Appl. No.: 10/898,774

(22) Filed: Jul. 26, 2004

(65) Prior Publication Data

US 2006/0017583 A1    Jan. 26, 2006

(51) Int. Cl.
  *G08G 1/097*    (2006.01)
(52) U.S. Cl. .................. 340/931; 246/473 R; 340/641; 340/907
(58) Field of Classification Search ................ 340/931, 340/907, 908, 953, 983, 985, 458, 641, 642; 701/19; 246/1 C, 473 R, 473.1, 473.2, 486, 246/473.3, 477, 483, 484; 250/339.02, 349, 250/559.11, 206, 208.1; 347/238; 362/800; 370/815.45; 324/414
  See application file for complete search history.

(56) References Cited

U.S. PATENT DOCUMENTS

| 3,551,676 | A | * | 12/1970 | Runnels ........................ 250/353 |
| 5,446,277 | A | * | 8/1995 | Rutter ..................... 250/214 R |
| 5,778,133 | A | * | 7/1998 | Plesko ......................... 385/146 |
| 6,222,446 | B1 | | 4/2001 | Hilleary ....................... 340/458 |
| 6,369,704 | B1 | | 4/2002 | Hilleary ....................... 340/458 |
| 6,614,358 | B1 | * | 9/2003 | Hutchison et al. ...... 340/815.45 |
| 6,642,856 | B1 | * | 11/2003 | DeMarco et al. ............ 340/981 |
| 6,688,561 | B1 | | 2/2004 | Mollet et al. ............. 246/473.1 |
| 6,717,526 | B1 | * | 4/2004 | Martineau et al. ...... 340/815.45 |
| 2003/0122039 | A1 | * | 7/2003 | Mollet et al. ............ 246/473 R |
| 2004/0119587 | A1 | | 6/2004 | Davenport et al. .......... 340/538 |
| 2006/0001547 | A1 | * | 1/2006 | Davenport et al. .......... 340/641 |

OTHER PUBLICATIONS

Texas Instruments, A Single-Supply OP-Amp Circuit Collection, Application Report SLOA058-Nov. 2000, by Bruce Cartr, pp. 1-26.
Illumination Fundamentals, Lighting Research Center, by Alma E.F. Taylor, 2000, pp. 1-46.

* cited by examiner

*Primary Examiner*—Brent A. Swarthout
(74) *Attorney, Agent, or Firm*—Fletcher Yoder

(57) ABSTRACT

An operational status detection system for a railroad warning device having a warning light, comprising: a photo detector configured to generate a signal corresponding to a light output of the warning light of the railroad warning device, the photo detector comprising a lens, an optical filter and a photodiode, wherein the optical filter is disposed between the photodiode and the lens and the optical filter is configured to provide the light output of the warning light to be presented as a substantially uniform spatial response to the photodiode wherein areas of high intensity of the warning light that are received by the lens are attenuated, the areas of high intensity providing higher light outputs than other areas of the warning light; and a microcontroller for receiving the signal, wherein the microcontroller compares the signal to at least one threshold value, the at least one threshold value corresponding to an acceptable light output of the warning light.

22 Claims, 12 Drawing Sheets

Single, bare photodiode sensitive to top and center of roundel surface

Left to Right Coverage

- Lamp 1 -30/15, Incandescent @ 10V
- Lamp 2 -20/32, Incandescent @ 10V
- Lamp 3 -70, Incandescent @ 10V
- Lamp 4 LED @ 10V
- Ideal Single, bare photodiode sensitive to top and center of roundel surface Bottom to Top Coverage

- Lamp 1 -30/15, Incandescent @ 10V
- Lamp 2 -20/32, Incandescent @ 10V
- Lamp 3 -70, Incandescent @ 10V
- Lamp 4 LED @ 10V
- Ideal

Variable Filter Concepts

Fixed ND Filter 92

92 Step ND Filter

92 Linear Variable Filter

92 Circular Variable Filter

APPARATUS AND METHOD FOR MONITORING THE OUTPUT OF A WARNING OR INDICATOR LIGHT

BACKGROUND

This invention relates generally to railroad crossing and wayside signals, and more particularly a method and apparatus for monitoring the operational status of the railroad crossing signal.

Railroad systems include wayside equipment such as switches, signals, and vehicle detectors including hot wheel detectors, dragging equipment detectors, high/wide load detectors, vehicle identification systems, etc. Such equipment must necessarily be located throughout the railroad system, and is thus geographically dispersed and often located at places that are difficult to access. Systems are currently in use for communicating operational and status information relating to the condition of the train or the track to control centers through various types of modems. For example, position indicators are provided on switches and a signal responsive to the position of a switch is communicated to a control center for that section of track.

Grade crossings where streets and railroad tracks intersect are provided with various types of warning systems and/or indicators that are used to alert pedestrians and roadway vehicle operators to the presence of an oncoming train. Passive warning systems include signs and markings on the roadway that indicate the location of the crossing. Active warning systems include the audible signal from a locomotive horn as well as various types of wayside warning devices, which are activated as the train approaches. The grade crossing warning devices may include visual and audible alarms as well as physical barriers. A typical crossing in an urban area may include signs painted onto the roadway and/or erected at the crossing and a fully automatic gate device with flashing lights and bells for blocking all lanes of roadway traffic.

Regular monitoring and maintenance of the grade crossing warning systems and equipment ensures proper operation of the device. Moreover, the Federal Railroad Administration mandates regular and periodic inspection of railroad-highway grade crossing warning systems. In order to perform such tasks, routine maintenance and inspections are performed on grade crossing warning equipment. In order to conduct such inspections an inspector will visit the site of each crossing periodically to inspect the equipment and to confirm its proper operation. In order to assist in the monitoring and maintenance of these systems remote or automatic sensing devices may be employed to provide signals indicative of the operation status of the system. Examples of such systems and devices are found in U.S. Pat. Nos. 6,222,446 and 6,688,561 and U.S. patent application Ser. No. 10/248,120 the contents of which are incorporated herein by reference thereto.

One of the items of the grade crossing warning equipment requiring monitoring is the operational status of the warning lights. In order to detect the operation status of the warning light a sensor or photo sensor is positioned to measure the output of the warning light. However, the location of the sensor or photo sensor may cause the sensor to be exposed to environmental conditions that may affect the accurancy of the sensor output. Furthermore, and in order to not block the light output while also measuring the same, the sensor may be positioned such that it will detect a non-uniform light signal (e.g., the sensor is not centrally located with respect to the light).

The development of an external sensor for monitoring the output irradiance of a railroad crossing flashing light must consider the non-uniform response provided to an external sensor not directly aligned with lamp face (i.e., lens or roundel). Accordingly, it is desirable to provide a method and apparatus for monitoring the operational status of the railroad crossing signal, which accounts for sensor position with respect to the lamp.

SUMMARY OF THE INVENTION

A sensor for monitoring the output irradiance of a railroad crossing flashing lamp that considers the non-uniform light output received by the photodiode.

An operational status detection system for a railroad warning device having a warning light, comprising: a photo detector configured to generate a signal corresponding to a light output of the warning light of the railroad warning device, the photo detector comprising a lens, an optical filter and a photodiode, wherein the optical filter is disposed between the photodiode and the lens and the optical filter is configured to provide the light output of the warning light to be presented as a uniform spatial response to the photodiode wherein areas of high intensity of the warning light that are received by the lens are attenuated (while areas that are of low intensity are not attenuated); and a microcontroller for receiving the signal, wherein the microcontroller compares the signal to at least one threshold value, the at least one threshold value corresponding to an acceptable light output of the warning light.

The lens forms an image of the entire roundel face so that the intensity distribution corresponding to what the detector sees can be attenuated or transmitted at each point of the roundel to create a uniform response.

An operational status detection system for a railroad warning device having a warning light, comprising: a plurality of photo detectors each being configured to generate a signal corresponding to a light output of the warning light of the railroad warning device, each of the plurality of photo detectors comprising a lens, an optical filter and a photodiode, wherein the optical filter is disposed between the photodiode and the lens and the optical filter is configured to provide the light output of the warning light to be presented as a uniform spatial response to the photodiode wherein areas of high intensity of the warning light that are received by the lens are attenuated; and a microcontroller for receiving each signal generated by the plurality of photo detectors, wherein the microcontroller compares each signal to at least one threshold value, the at least one threshold value corresponding to an acceptable light output of the warning light.

A method for remotely monitoring the light output of a warning light of a railroad crossing warning system, comprising: inverting and compressing an image of the light output with a lens offset from a central portion of the warning light; filtering the image provided by the lens with an optical filter, wherein the optical filter is configured to selectively attenuate the image to provide a filtered light output; sampling the filtered light output with a photodiode, the photodiode generating a signal corresponding to the output current of a photodiode; comparing the signal to an acceptable threshold value to generate an operational status signal; and providing the operational status signal to a remote monitoring system.

A warning light for a railroad crossing, comprising: a housing for a light emitting device; a roundel secured to the housing, the roundel being positioned in front of the light emitting device to provide an illuminated surface of the warning light; a shroud extending from the housing and the roundel; a photo detector secured to the shroud and being positioned to detect light from the illuminated surface wherein the photo detector is configured to provide an operational status signal of the warning light, the photo detector comprising; a lens, an optical filter and a photodiode, wherein the optical filter is disposed between the photodiode and the lens and the optical filter is configured to provide a light output of the warning light to be presented as a uniform spatial response to the photodiode wherein areas of high intensity of the warning light that are received by the lens are attenuated; and a microcontroller for receiving the signal, wherein the microcontroller compares the signal to at least one threshold value, the at least one threshold value corresponding to an acceptable light output of the warning light.

DETAILED DESCRIPTION OF EXEMPLARY EMBODIMENTS OF THE INVENTION

Disclosed herein is an operational status detection system for a railroad warning device having a warning light. The system will remotely provide a signal indicative of the operational status of the warning light. The system includes a photodiode or other optical sensor configured to generate a signal corresponding to light output of the warning light of the railroad warning device when the device is activated. The signal is filtered to provide a uniform response corresponding to the light output of the warning light. More specifically, and in accordance with exemplary embodiments, the photodiode is provided with an optical filter, which in conjunction with a lens filters the radiated light of the warning light to provide a spatially uniform light output (relative to the warning light face) to the photodiode. In other words, the optical filter adjusts or filters the light signal so that a uniform light output is provided to the photodiode, wherein stronger portions of the light output are blocked so that they are provided in substantially the same strength as weaker portions of the light output. The strength of the light output is attributable to the location of the optical sensor with regard to the lamp face (e.g., disposed away from the center of the lamp face).

The photodiode signal is then received by a microcontroller which compares the output signal to a pair of threshold values corresponding to a range of an acceptable light output of the warning light. In this fashion, the system will be able to detect possible failure modes, which may yield a decrease in light output as well as an increase in light output. Thus, the signal is compared to a pair of thresholds which define the "nominal" light values in the acceptable region. Thereafter, the microcontroller provides a signal indicative of the operational status of the warning light (e.g., light output ok or below or above an acceptable level).

If the signal indicates that the light output is outside an acceptable range a maintenance crew is dispatched to determine the cause of the unacceptable light output, which may be due to a variety of items related to routine maintenance such as, a burned out lamp, a cracked lens or lamp roundel, debris on the lens of the warning light, etc. In addition, any one of these causes may occur at random thus, a remote monitoring system provides an almost immediate indication of a warning light having a low light output.

Figure 1:
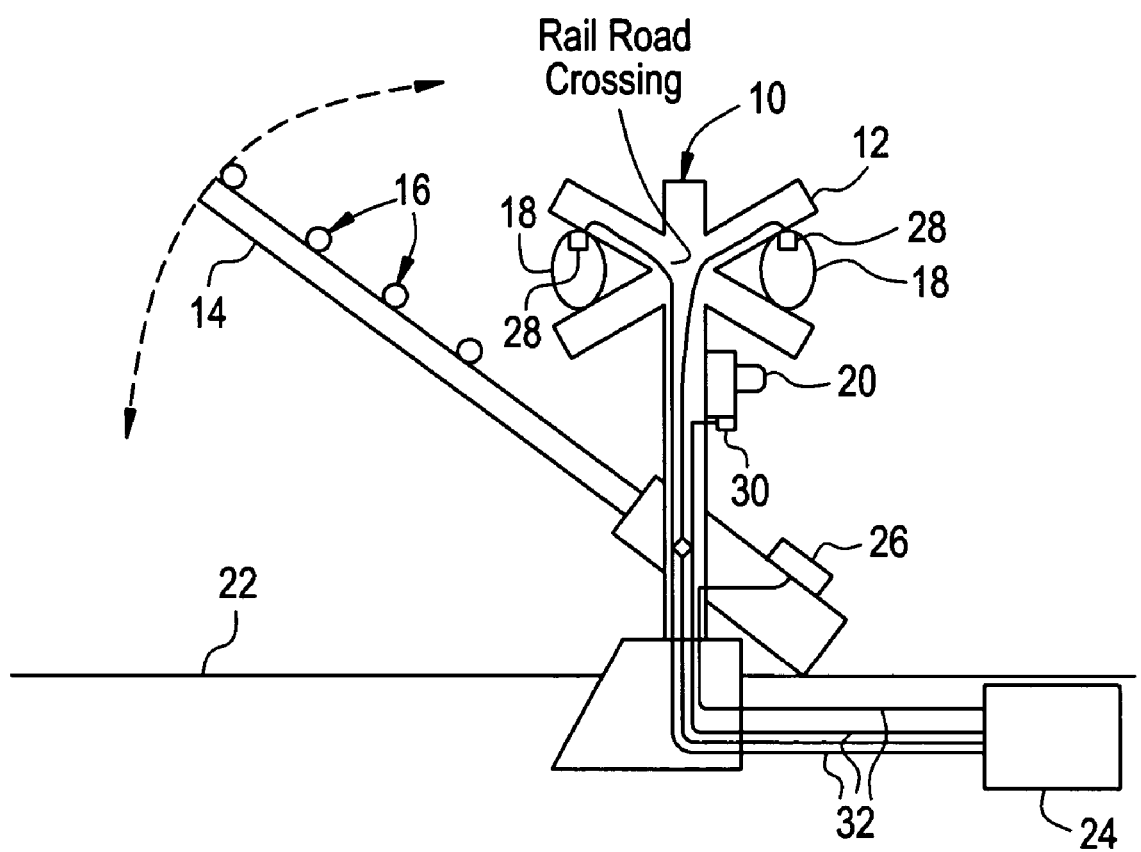
FIG. 1 is an illustration of a railroad warning device.

Referring now to FIG. 1, a non-limiting example of a railroad grade crossing signal post 10 is illustrated. In the illustrated embodiment, the railroad grade crossing signal post 10 comprises a sign 12 having the familiar cruciform shape, a swing gate 14 with attached lamps/reflectors 16, warning lights 18 and alarm bell 20. The position of the gate 14 and the operational status of the lamps/reflectors 16, warning lights 18 and alarm bell 20 are controlled in response to the proximity of a rail vehicle to the grade crossing 22. It is, of course, understood that the signal post may comprise one or more of the aforementioned items and the positioning of the same may vary. For example, the swing gate may be separately located from post 10 and the positioning of the lamps/reflectors 16, warning lights 18 and alarm bell 20 may vary.

During operation and prior to the arrival of an approaching rail vehicle (e.g. locomotive), the gate 14 is moved to a horizontal position and the lamps 16, warning lights 18 and bell 20 are all activated to block road vehicle traffic and to warn pedestrians and road vehicle operators of an approaching train.

In the illustrated embodiment, a wayside equipment box 24 is used to house the power and control components necessary for the operation of the various components of the signal post 10. Associated equipment may be located proximate to the grade crossing 22 in either direction for sensing the approach of a train and for initiating a warning configuration of the signal post 10. In order to provide the signal post with the proper signals for operation a plurality of sensors are provided to provide signals to the functional systems in order to automatically lower the gate and activate the lights etc.

Furthermore, and in order to determine if the warning systems are operating properly (e.g., a warning light is flashing when a signal of an oncoming train is received) a plurality of sensors are also provided to detect proper operation of the various components of the signal post 10. For example, a position sensor 26 is attached to the swing gate 14 for detecting when the gate 14 is in its upright and lowered positions. Position sensor 26 may take the form of a mercury level switch, one or more limit switches, an ultrasonic or infrared sensor, a potentiometer, or any other type of device useful for determining the position of the gate 14. A photo sensor 28 is located proximate to warning light 18 for detecting when light 18 is emitting a predetermined pattern of light energy. A sound detector 30 is located proximate to bell 20 for detecting when bell 20 is emitting a predetermined pattern of sound energy. Each of these sensors may be connected to associated power supplies, converters, amplifiers, microprocessors, etc. located in equipment box 24 via respective cables 32. Alternatively, the associated power supplies, converters, amplifiers, microprocessors, etc. are located proximate to the sensor. Furthermore, the signals of the operational sensors are stored in memory or immediately sent to a monitoring station in order to indicate whether maintenance of the system is required.

Figure 2:
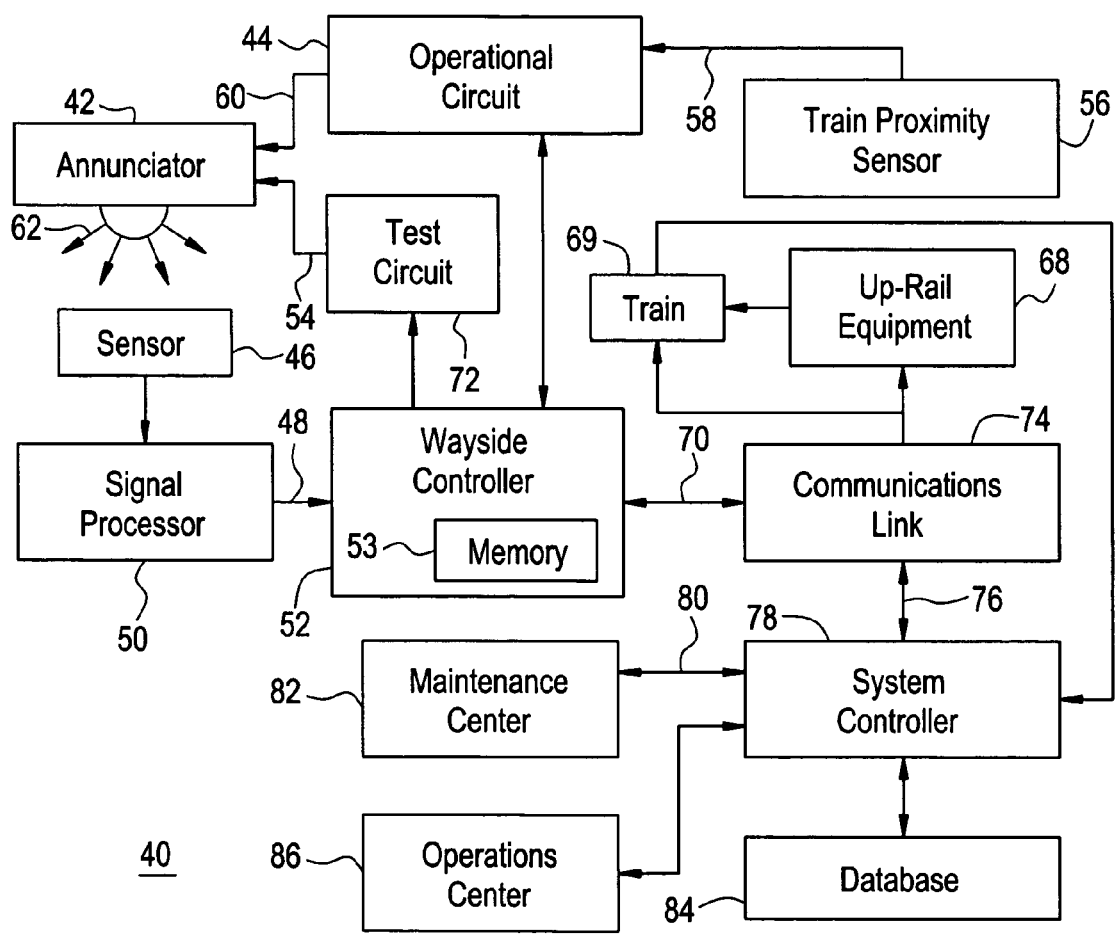
FIG. 2 is a schematic illustration of a system for providing remote monitoring of a railroad warning device.

The components illustrated in FIG. 1 form part of a grade crossing equipment monitoring system 40, which is further illustrated in the functional diagram of FIG. 2. A grade crossing annunciator 42 in its general configuration may be any of those known in the art, which includes but is not limited to the following items such as swing gate 14, lamp/reflector 16, warning light 18 or alarm bell 20. An operational circuit 44 for delivering a warning of an approaching rail vehicle controls the annunciator 42. A train proximity sensor 56 is located along a rail line to sense the approach of a rail vehicle to a grade crossing location. Upon receipt of a train proximity signal 58 from train proximity sensor 56, the operational circuit 44 provides an alarm signal 60 to annunciator 42. Annunciator 42 functions to emit a predetermined output 62, such as sound emitted from a bell or light emitted from lamps 16 or 18 or tilting movement of gate 14. A sensor 46 is used to detect the output 62 of annunciator 42 and to provide a sensor signal 48 responsive to the operation of the annunciator 42. A signal processor 50 such as an amplifier, filter, converter, etc. may be used to place sensor signal 48 in a form suitable for input to a controller 52.

Controller 52 may be of any type known in the art for implementing the operations described below. Controller 52 may be located at the grade crossing location 22, such as within a wayside equipment box 24 proximate the grade crossing signal post 10. In exemplary embodiments controller 52 and/or equivalent devices are used to operate the signal post as well as provide information indicative of the operation of the various components of the signal post. For example, the controller or and/or equivalent devices may comprise among other elements a microprocessor, read only memory in the form of an electronic storage medium for executable programs or algorithms and calibration values or constants, random access memory and data buses for allowing the necessary communications (e.g., input, output and within the microprocessor) in accordance with known technologies.

It is understood that the processing of the above description may be implemented by a controller operating in response to a computer program. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

As described above, algorithms for implementing exemplary embodiments of the present invention can be embodied in the form of computer-implemented processes and apparatuses for practicing those processes. The algorithms can also be embodied in the form of computer program code containing instructions embodied in tangible media, such as floppy diskettes, CD-ROMs, hard drives, or any other computer-readable storage medium, wherein, when the computer program code is loaded into and executed by a computer and/or controller, the computer becomes an apparatus for practicing the invention. Existing systems having reprogrammable storage (e.g., flash memory) that can be updated to implement various aspects of command code, the algorithms can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer. When implemented on a general-purpose microprocessor, the computer program code segments configure the microprocessor to create specific logic circuits.

These instructions may reside, for example, in RAM of the computer or controller. Alternatively, the instructions may be contained on a data storage device with a computer readable medium, such as a computer diskette. Or, the instructions may be stored on a magnetic tape, conventional hard disk drive, electronic read-only memory, optical storage device, or other appropriate data storage device. In an illustrative embodiment of the invention, the computer-executable instructions may be lines of compiled C++ compatible code.

In an exemplary embodiment controller 52 includes logic for evaluating sensor signal 48 to determine if annunciator 42 is performing properly. For example, if annunciator 42 is a flashing warning light the sensor may comprise a photodiode proximate to the warning light to detect the light output of the warning light in order to provide a signal indicative of the performance of the warning light. The signal 48 provided by such a sensor 46 may be processed and recorded by controller 52 to develop information 70 regarding the operating status of annunciator 42. That information 70 may take the form of a simple go/no-go decision wherein proper and improper performances are differentiated. Alternatively, more robust information 70 may be developed depending upon the type of annunciator 42 being monitored and the sophistication of the sensor 46 and logic performed by controller 52. For example, a history of performance data may be recorded with future performance being predicted on the basis of the data trend.

Alternatively if annunciator 42 is a bell, the sensor 46 may be a microphone placed proximate the bell or a solid-state accelerometer attached to the bell housing or other structure mechanically connected to the bell and vibrating therewith. For audio performance data, the information 70 may include volume, frequency, and pattern of sound verses time. For visual performance data, the information 70 may include wavelength, intensity and pattern of light verses time. If the annunciator 42 is a level sensor 26 for a swing gate 14, the information 70 may include the angle at stop positions and speed of angle change during movement verses time. One may appreciate that the information 70 to be developed would preferably be directly responsive to known failure modes and performance characteristics of the particular type of annunciator 42 being monitored.

Information 70 regarding the performance of annunciator 42 may be developed each time annunciator 42 is energized by operational circuit 44 and/or it may be developed periodically in accordance with a schedule. The schedule of monitoring may, itself, be made responsive to the information 70 in the event that indications of sensor degradation are detected. A special test circuit 72 may be provided to operate the annunciator 42 in a test mode, such as to exercise annunciator 42 in a manner or on a schedule that is not possible with operational circuit 44. To detect possible intermittent failures, data may be recorded each time that the annunciator 42 operates, and the schedule of this data may be compared to the schedule of trains passing the grade crossing. An intermittent failure may be identified by an occasional difference between these two schedules. The test circuit 72 may be responsive to the information 48 developed during a previous operation of annunciator 42. For example, should the information 48 be interpreted by controller 52 as indicating the likelihood of a developing problem, the test circuit 72 may be instructed to perform a special test indicative of that developing problem. In one embodiment, a single indication of a malfunctioning annunciator bell or other device (e.g., warning light) may be detected by sensor 46. In order to determine if that single indication was simply spurious information or if it was truly indicative of a real problem with the device being monitored, the test circuit may be instructed by logic resident in controller 52 to produce a rapid series of test signals to determine if a particular device is operating properly. If the sensor 46 detects proper performance of the device during each of these tests, the single indication may be deemed to be a spurious indication. Such information may be recorded in memory 53 or other database for future reference in the event of other occurrences of seemingly spurious malfunctions.

Information 70 may be recorded and stored locally in a memory 53 for use by an inspector making periodic visits to the site of the crossing. Advantageously, the information 70 may be communicated to a location remote from the railroad crossing by a communications link 74. The term remote location is used herein to mean a location outside the immediate area of the grade crossing; for example a railway control center located one or many miles from the grade crossing. The remote location may alternatively be a service center having responsibility for inspecting and maintaining the grade crossing warning systems at a plurality of crossings. The remote location to which the information 70 is communicated will be located at a distance from the grade crossing that is greater than that of the approaching train.

Communications link 74 may take any form known in the art, such as a wireless, landline, and/or fiber optic communications device having a transmitter and a remote receiver. Communications link 74 may include and make use of access to the Internet 76 or other global information network. A remote central system controller 78, such as a computerized data processor operated by a railroad or rail crossing service provider, may receive the information 70 from the communications link 74. Information 70 may be received by the system controller 78 regarding a plurality of annunciators 42 at a plurality of crossings within a railroad network. The readiness of grade crossing warning equipment throughout the network may thus be easily and automatically monitored at a central location. Data regarding the make, model, location, installation date, service history, etc. of each annunciator 42 throughout the network may be maintained in a database 84 accessible by the system controller 78. The database 84 may also be updated to include performance information 70 from individual annunciators.

The storage of information 70 in database 84 would permit a trending analysis to be performed on the response of annunciator 42. For example, a change in the time between the delivery of a test signal 54 and the operation of annunciator 42 may be indicative of a developing problem. Early recognition of a change in the system characteristics may permit problems to be fixed before they result in a condition wherein the annunciator 42 fails to respond in a safe manner.

Communications link 74 may include communication equipment located on a passing train 69, so that the information 70 is conveyed from the grade crossing location 22 to the train 69 and then forwarded to a remote location by a transmitter located in the train. The communication to system controller 78 may be routed via the train 69 through a communications transmitter/receiver existing on the train 69 for other purposes. Alternatively, communications link 74 may communicate with up-rail equipment 68 such as a wayside signaling device so that appropriate warnings may be provided to trains 69 on the rail line regarding a malfunction of annunciator 42. Oncoming trains 69 may be signaled to stop or to proceed at a slow speed when an annunciator 42 is not working properly.

Malfunctions of the annunciator 42 may trigger a service request 80 that is forwarded to a maintenance center 82. The maintenance center 82 may be a stationary facility or a mobile repair center or combination thereof for providing equipment and personnel necessary for performing maintenance activities on the grade crossing warning equipment. Maintenance center 82 may also include a database for storing information related to such maintenance activities and data processing equipment for receiving information through the communications link 74 and for taking appropriate action to effect any appropriate maintenance activity related to the service request 80. The system controller 78 may generate the service request 80, or it may be generated as a result of cooperation between the system controller 78 and the maintenance center 82, or it may be generated by the maintenance center 82 alone. The service request 80 is responsive to annunciator-specific information from the database 84 as well as the malfunction-specific information 70. Personnel at the maintenance center 82 may then adequately prepare to accomplish the necessary repair, including the implementation of any equipment upgrades that may be necessary to bring annunciator 42 to current standards. The communication path between the maintenance center 82 and the wayside controller 52 may further be used to interrogate the wayside controller 52 and/or to deliver software of other forms of electronic data and information to the grade crossing equipment. In this manner, software located at a plurality of grade crossings throughout the railroad network may be conveniently upgraded from a central location. Video, audio and graphics links may also be established from the maintenance center 82 to the grade crossing location via this grade crossing equipment monitoring system 40 in order to assist the repairperson in making the necessary repairs and upgrades. An Internet or other multi-media communications link may be especially useful for this application to facilitate convenient access to the information by a plurality of interested parties and to facilitate two-way communication.

An operations center 86 may also receive notification of a malfunctioning annunciator 42. The operations center 86 may be the rail traffic control center for the railroad or other location having equipment and personnel necessary for controlling the operation of trains of a railroad. Upon learning of a malfunctioning annunciator 42, it may be appropriate to divert or slow traffic on certain portions of the rail system. The two-way communication provided by this grade crossing equipment monitoring system 40 may be used to augment the normal traffic control channels available to the railroad for responding to the notification of a failure of a grade crossing annunciator 42.

Automation of these inspections with sensors provides increased visibility into warning system performance and also provides productivity benefits for railroads. Railroad crossing flashing warning lights must be inspected on a monthly basis to confirm proper visibility of the lights for approaching motorists. This disclosure teaches a system and method for deploying a light sensor to monitor the light performance during each activation of the crossing warning system. Such a light sensor system should be mounted external to the flashing light head in order to capture the effects of lens damage, accumulated dirt and debris on the lens in addition to failure of the optical light source (incandescent bulb and reflector or LED array). Such an externally mounted light sensor will be subjected to ambient sunlight signals which may be much larger than light levels generated by the warning lamp.

Figure 3:
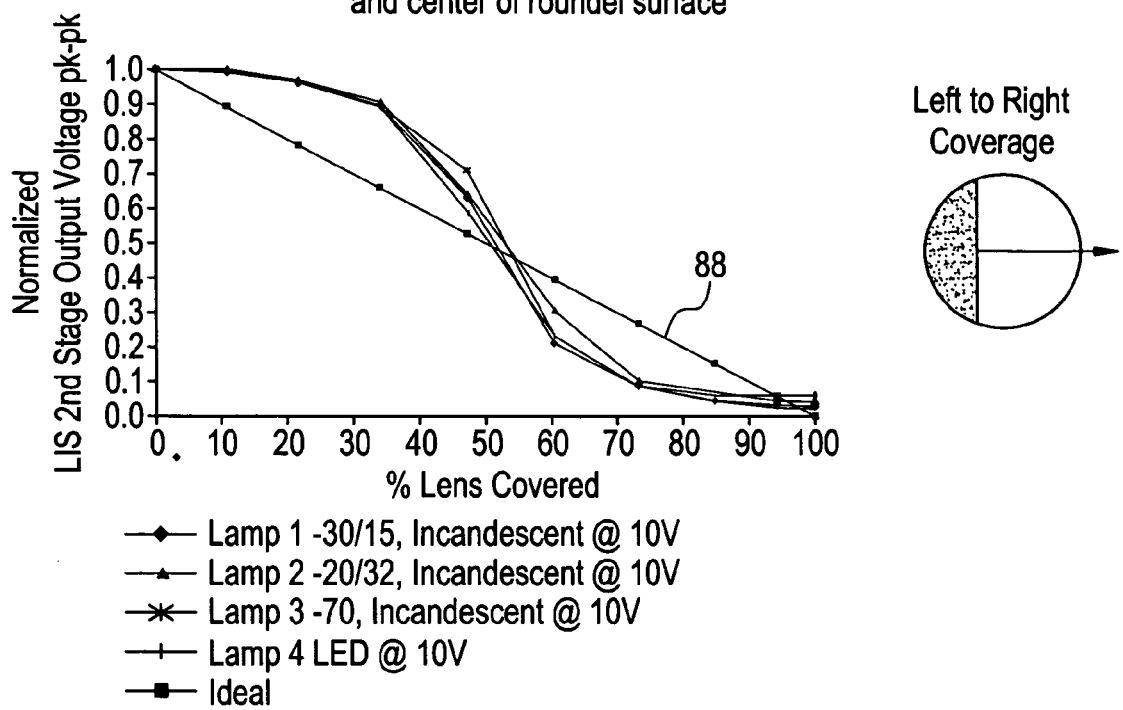
FIG. 3 is a graph illustrating the output voltage of a photodiode (without optical filtering) with respect to portions or percentages of the lamp face covered from left to right.
Figure 3:
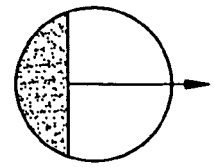
Figure 4:
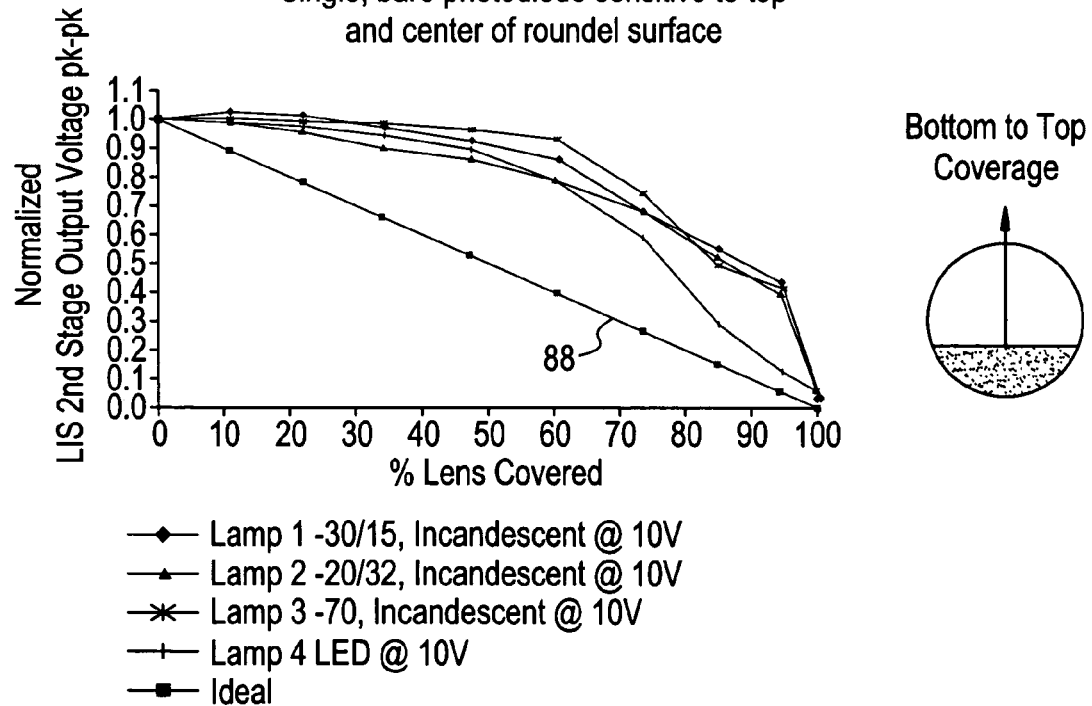
FIG. 4 is a graph illustrating the output voltage of a photodiode (without optical filtering) with respect to portions or percentages of the lamp face covered from the bottom to top.
Figure 4:
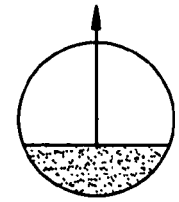

FIGS. 3 and 4 are graphs illustrating the normalized output voltage (peak to peak) of a single, bare photodiode (without either lens or optical filtering) as increasing portions or percentages of the lamp face are covered. In particular, FIG. 3 illustrates the trace of four separate lamps as the lamp face is covered from the left to the right. In these tests the photodiode with the lens was located on the underside of the hood, offset vertically from the lamp. For these tests, the photodiode was approximately 8 inches out from lamp face on underside of the hood, along the hood centerline, similar to that shown in FIG. 7A and FIG. 8. In addition, a trace of an ideal or linear response is illustrated by line 88. The trace of the ideal or linear response was determined by the following formula analysis. The ideal linear response is based on the fraction of the area which is covered producing a corresponding decrease in signal, but the system also works if the detected voltage increases or goes outside of an acceptable band of voltages (e.g. an upper limit and a lower limit) as certain blockages/obscurations can cause an increase in voltage output of the photodiode. For example, some types of blockages may scatter and/or diffuse the light source, which would result in an increase in light reaching the sensor. This increase may be wavelength dependent (e.g., red light may be attenuated however, infra red wavelengths that are scattered and/or diff-used may become more "visible" to the sensor). Accordingly, exemplary embodiments of the present invention will determine if the detected voltage goes outside of an acceptable band of voltages.

Assuming the sensor affords a uniform spatial response with respect to the lamp face, the sensor output should decrease in direct proportion to the amount of lamp face coverage. As noted herein, some types of obstructions/blockages of the lamp face may yield light scattering, diffusion, or reflection, which may still reach the photodiode. However, the concept of these tests was that with a "perfect" absorbing (e.g., 100 percent) obstruction, the ideal linear relationship should be apparent. As illustrated by the lines of the four individual lamps tested, portions of the output voltage are either above or below ideal line 88. Moreover, the graph of FIG. 3 illustrates that as a portion of the lamp face is covered the output voltage increases.

Referring now to FIG. 4, the graph illustrates the trace of four separate lamps as the lamp face is covered from the bottom to the top. In these tests the single, bare photodiode with the lens was located on the underside of the hood, offset vertically from the lamp. For these tests, the photodiode was approximately 8 inches out from lamp face on underside of the hood, along the hood centerline, similar to that shown in FIG. 7A and FIG. 8. In addition, a trace of an ideal or linear response is illustrated by line 88. Again, the trace of the ideal or linear response was calculated by the analysis discussed above. As illustrated by the lines of the four individual lamps tested, portions of the output voltage are primarily above ideal line 88. Accordingly, the graph of FIG. 4 illustrates that as a portion of the lamp face is covered from the bottom up, the output voltage decreases very gradually until at least 60 percent of the lamp face or lens is covered. Accordingly, FIG. 4 clearly shows that the output of the photodiode without optical filtering is skewed in relation to its proximity to the top portion of the lens of the warning light.

Figure 5:
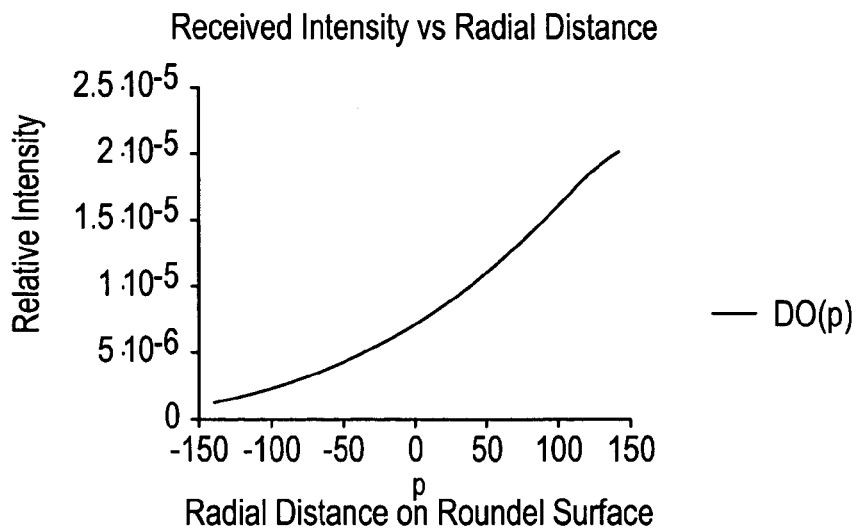
FIG. 5 shows graphs illustrating the intensity drop off of a single photo detector (without optical filtering) with respect to radial distance or position away from a lamp face.
Figure 5:
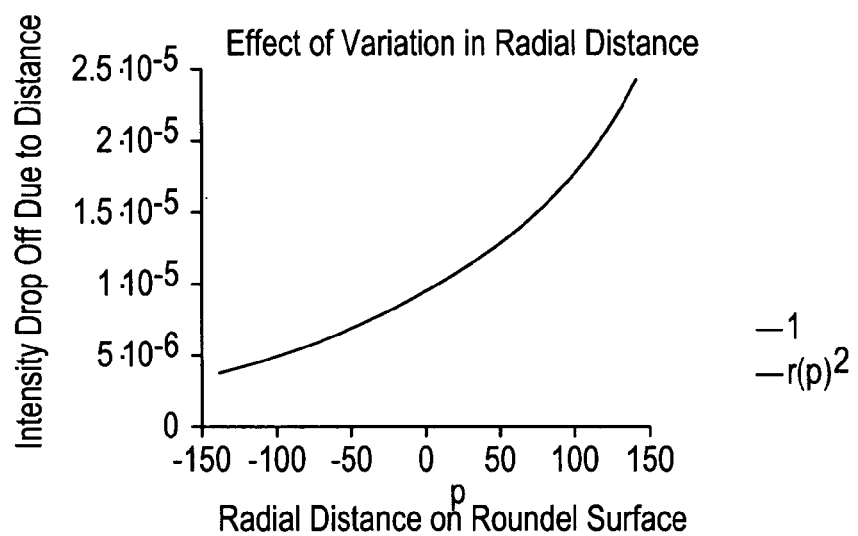
Figure 5:
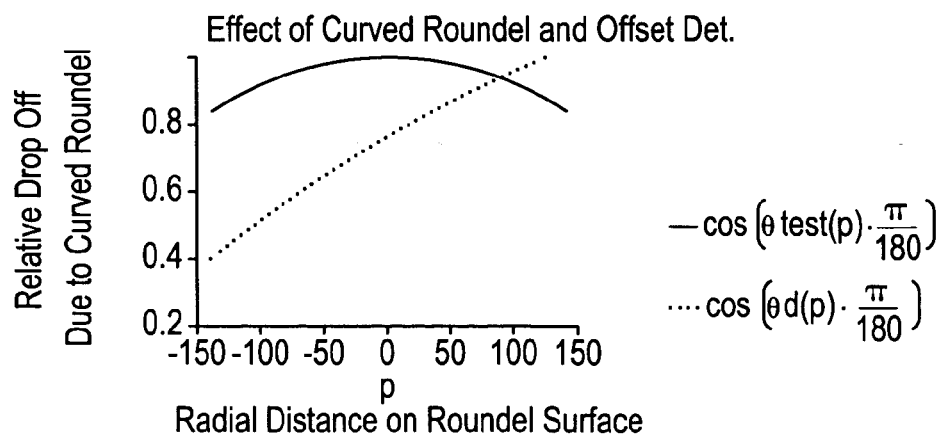

FIG. 5 includes graphs that illustrate the received intensity drop off of a single photo detector without optical filtering vs. radial position or radial distance with respect to the lens of the warning light. In the example provided, the photo detector is located eight inches from the vertex of the roundel of the warning light.

Figure 6:
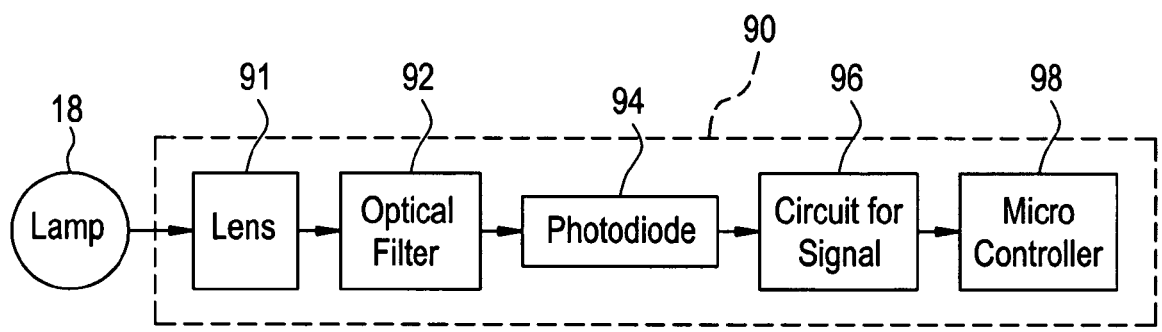
FIG. 6 is a schematic illustration of an exemplary embodiment of the present invention.

Referring now to FIG. 6 a schematic illustration of an exemplary embodiment of the present invention is illustrated. Here a system for use with the sensor for monitoring the light energy output of the warning light 18 of the rail grade crossing system is illustrated. The illustrated system provides a sensor for monitoring the output irradiance of a railroad crossing flashing light that considers the disparity or intensity of the light received from a surface of the warning light (i.e., lens or roundel) with respect to the position of the photo sensor with regard to the center or high light intensity portions of the lens of the warning light.

In an exemplary embodiment, a light intensity sensor (photodiode) is mounted external to the lamp head. An exemplary mounting location may include underneath a hood or shroud of the warning light. The light sensor has an acceptance angle and installation alignment, which affords a field of view including lamp surface and black background surface to reduce input of ambient light.

As discussed above and referring now to FIG. 6, the sensor 46 and signal processor 50 (FIG. 2) are combined into a single photo detector 90 illustrated schematically by the dashed lines in FIG. 6. In accordance with an exemplary embodiment photo detector 90 comprises the following elements; a lens 91, an optical filter 92, a photodiode 94, a circuit 96 for receiving the signal generated by photodiode 94, and a microcontroller 98 for receiving the signal generated by circuit 96. The photodiode generates current, which is amplified and converted to a voltage via a transimpedance amplifier or other equivalent device of circuit 96.

A microcontroller having an analog-to-digital converter then samples the output of circuit 96. The sampled output is then compared by algorithm of a microcontroller to a threshold defined for minimum or maximum acceptable light levels. If the observed signal falls outside the thresholds defining acceptable performance, an alarm is recorded locally in the crossing equipment's data recorder. The alarm may also be conveyed to a remote monitoring center for subsequent action by railroad maintenance.

In one embodiment, circuit 96 comprises a trans impedance amplifier, a high pass filter (with gain), and an analog to digital converter for providing a signal to the microcontroller. Furthermore, circuit 96 may be configured to filter portions of the signal of photodiode 94 that are attributable to ambient sunlight comprises filtering circuit 96 and a micro-controller 98. Further explanation of such a circuit is found in co-pending U.S. patent application Ser. No. 10/882,033 filed Jun. 30, 2004, the contents of which are incorporated herein by reference thereto.

In one embodiment and referring now to FIGS. 2 and 6, micro-controller 98 comprises a portion of signal processor 50 or alternatively micro-controller 98 comprises a portion of controller 52.

As will be discussed herein optical filter 92 provides a means for providing a uniform light output to the photodiode disposed radially or angularly away from the center of the lens of the warning light, wherein the photodiode is aimed at the center of the lamp face of the warning light.

It is also contemplated that other types of optical filtering of the input signal prior to its reception by the photodiode could be employed in accordance with exemplary embodiments of the present invention. In particular, red color filtering may be applied such that only the red light of the warning lamp reaches the photodiode. Optical filters which block infra red radiation wavelengths generated by incandescent lamp sources may also be blocked by an appropriate infra red cut filter. As applications require, it is also understood that other wavelengths may be blocked by the optical filter. Thus, portions of the visible spectrum, infrared radiation, ultraviolet radiation etc. can be filtered by appropriately configured filters. A non-limiting example of such other wavelengths include but are not limited to red, green, yellow and other possible colors for the lens of the warning light in addition to IR wavelengths, UV wavelengths and segments thereof. Non-limiting examples of possible ranges to be filtered or allowed to pass through the filter are described in Illuminating Fundamentals, Rensselaer Polytechnic Institute, 2000 the contents of which are incorporated herein by reference thereto, in particular reference is made to pages 7 and 8.

Figure 7A:
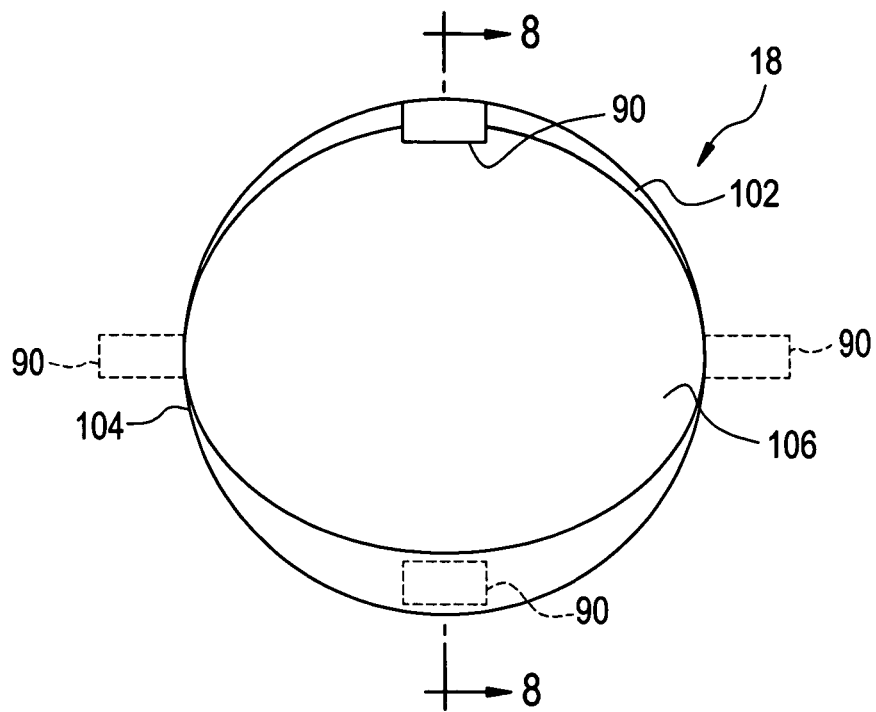
FIGS. 7A and 7B are front plan views of a warning lamp with a light intensity sensor in accordance with an exemplary embodiment of the present invention.
Figure 7B:
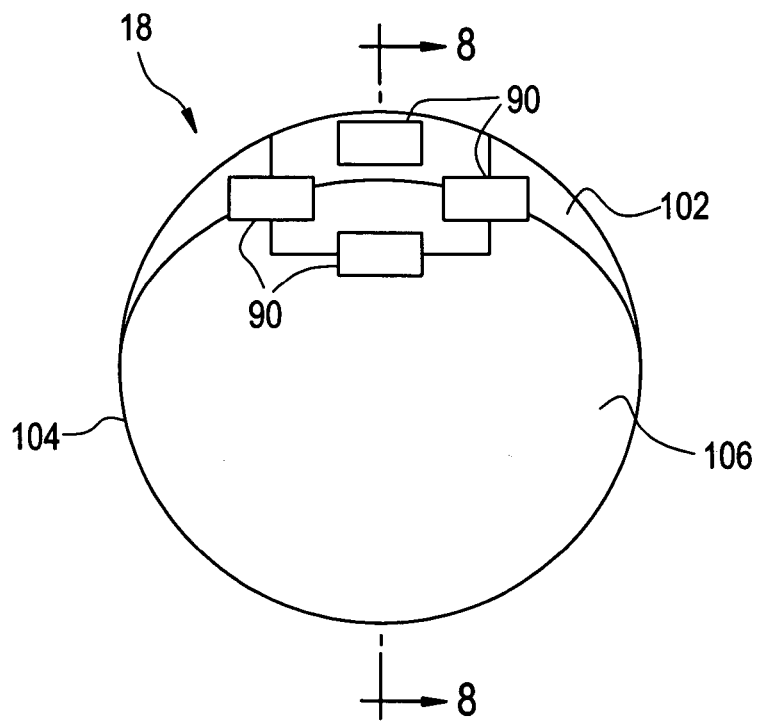
Figure 8:
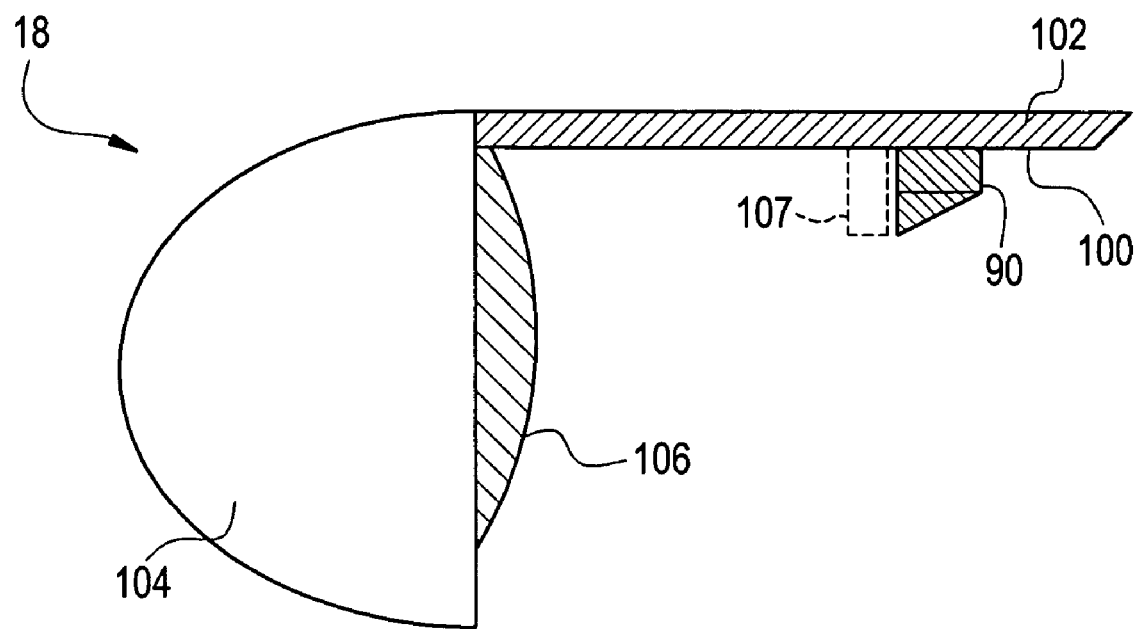
FIG. 8 is a view along lines 8—8 of FIG. 7.

Referring now to FIGS. 7A through 8, a warning lamp 18 with a photo detector 90 is illustrated. Here photo detector 90 is secured to an underside 100 of a hood 102. Hood 102 extends away from a lamp housing 104, which comprises a lens or lamp roundel 106 that covers a source of light for the warning lamp. As is known in the related arts lens 106 allows light to pass therethrough and may be colored to provide a desired colored light output (e.g., red, green, yellow, etc.). In an exemplary embodiment, photo detector 90 is angularly oriented towards the center of the lens 106. A non-limiting example of the distance of the photodiode from the lens is 8 inches with an angular orientation of 37 degrees down from the hood. It is, of course, understood that aforementioned values may be greater or less than those previously mentioned. In an alternative exemplary embodiment, a red filter 107 is disposed in front of the photo detector 90. As will be discussed herein filter 107 may be configured to optically filter numerous ranges of wavelengths corresponding to certain colors and others optical signals (e.g., infrared light). Alternatively, filter 107 and filter 92 are combined to provide a single optical filter providing multiple filtering characteristics.

In yet another alternative exemplary embodiment and as illustrated by the dashed lines in FIG. 7A, a plurality of sensors or photo detectors are positioned about the periphery of the warning lamp. In yet another alternative exemplary embodiment and as illustrated by the dashed lines in FIG. 7B a plurality of sensors or photodiodes are located on the hood but oriented such that they are pointing at specific regions of the roundel surface. The plurality of sensors or photodiodes are used to obtain a uniform response across the surface of the lamp surface. That is to say, changes in light output due to debris or damage can be detected independent of their placement on the lamp surface. Each sensor of the plurality may be sampled independent of the others and its output compared to nominal operation thresholds. In another embodiment, the outputs of the plurality of sensors may be summed into a single, composite signal. This composite signal could then be sampled and compared against pre-defined acceptance thresholds.

For example, one multiple photodiode approach utilizes individual channels each with their own photo detector, amplifier and filter to provide a signal into a common summing amplifier with single A/D converter in a single microcontroller. Another, multiple photodiode approach contemplates individual channels each with their own photo detector and amplifier wherein signals are fed to summing amplifier. Then the summed output of the summing amplifier is fed to a single filter circuit, if applicable, and then sampled by a single A/D converter in a microcontroller. In yet another multiple photodiode approach individual channels each with their own photo detector, amplifier and filter provide signals to multiple A/D channels of the microcontroller as the data is sampled. In this embodiment, each channel is compared to acceptable thresholds (e.g., acceptable range or high to low values) or the channels are summed in the microcontroller then compared to the acceptable thresholds.

Referring now to FIGS. 9 through 12, a photo detector 90 constructed in accordance with exemplary embodiments of the present invention is illustrated. Photo detector 90 comprises a mounting plate 110 for securement to surface 100 of hood 102. A non-limiting example of a securement means for securing mounting plate 110 to hood 102 are a plurality of bolts or screws 112. A sensor housing 114 is secured to a portion of mounting plate 110. Sensor housing 114 is configured to receive and house photodiode 94, optical filter 92 and lens 91. In an exemplary embodiment lens 91 is disposed within an opening 118 of housing 114.

Lens 91 provides a means for forming the image or light output received to specifically attenuate the area of the lamp face, as the optical filter itself would only be able to attenuate one spot at a time. Lens 91 is configured to make a small inverted image of the roundel wherein the lens provides a demagnification of approximately of ⅛₀ of the light received from the roundel and the light is compressed at the back focal plane of the lens in order to accommodate the angle of the housing with respect to mounting plate 110. In one embodiment the housing is provide at an angle of approximately 37 degrees with respect to the mounting plate. Of course, it is understood that this angle may vary to be greater or less than 37 degrees wherein the lens compresses the light received from the face of the roundel. In addition, the demagnification may also vary to be greater or less than ⅛₀.

Figure 11:
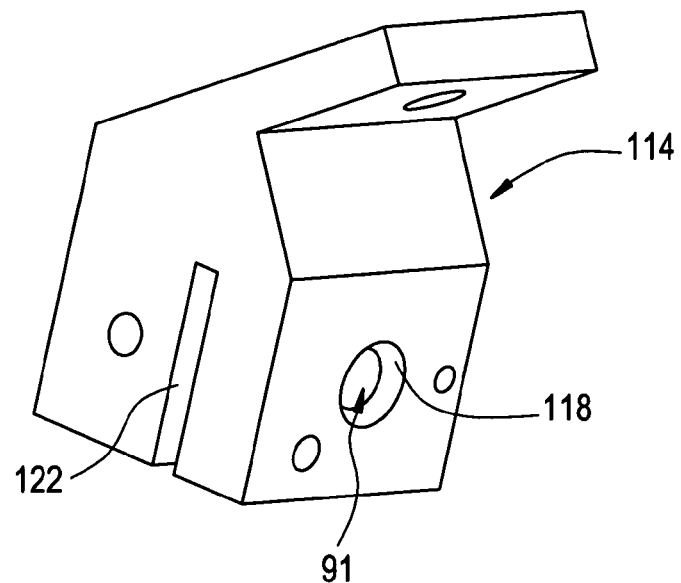
FIG. 11 is a perspective view of a light intensity sensor constructed in accordance with an exemplary embodiment of the present invention.
Figure 12:
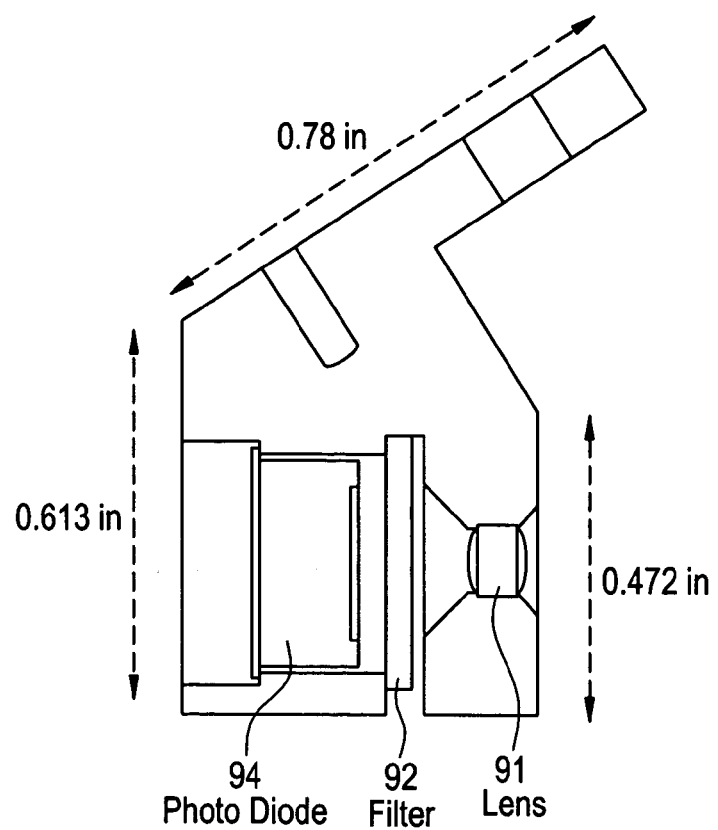
FIG. 12 is a cross sectional view of the light intensity sensor of FIG. 11.

Thus, lens 91 is directed to receive the radiance of the light from the lamp, roundel lens and in some aspects the housing of the warning light. Housing 114 is configured such that housing 114 is mounted to mounting plate 110 by a plurality of mounting screws 120 and opening 118 is angularly positioned with respect to the surface of mounting plate 110. In an exemplary embodiment, the angular positioned of opening 118 with respect to mounting plate 110 aligns lens 91 with a central portion of the roundel of the warning light. In addition, housing 114 is provided with an optical filter receiving area 122 that is configured to receive and retain optical filter 92. As illustrated in FIGS. 11 and 12 optical filter 92 is positioned to receive the light output from lens 91

(e.g., inverted image that is demagnified and compressed) prior to its receipt upon photodiode 94. Accordingly, optical filter 92 is positioned to provide optical filtering of the light or radiation received by lens 91 prior to its sensing by photodiode 94. In other words, housing 114 defines a path or opening for the light to travel from the lens 91 to filter 92 and ultimately to photodiode 94. It is also noted that the dimensions illustrated in FIG. 12 are provided as a non-limiting example of the dimensions of a housing constructed in accordance with an exemplary embodiment.

Figure 9:
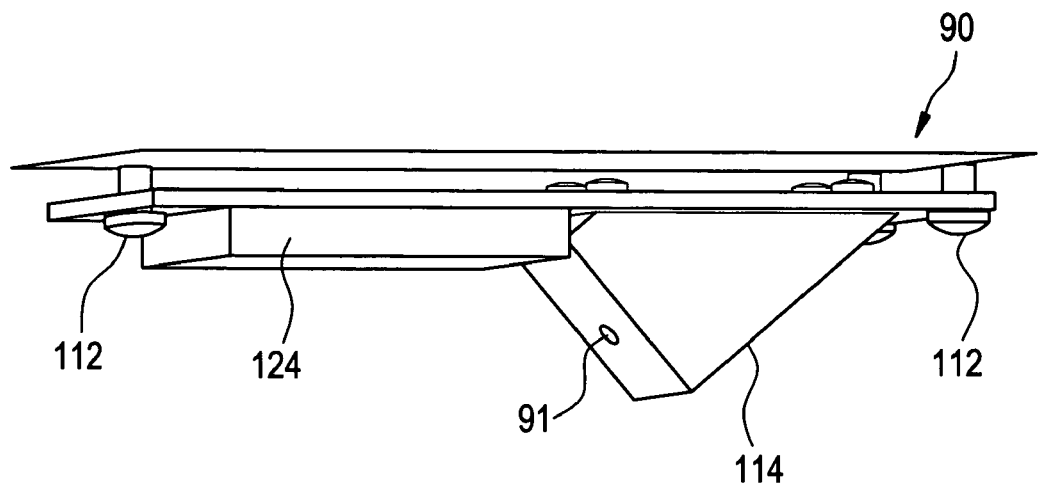
FIG. 9 is a perspective view of a light intensity sensor constructed in accordance with an exemplary embodiment of the present invention.
Figure 10:
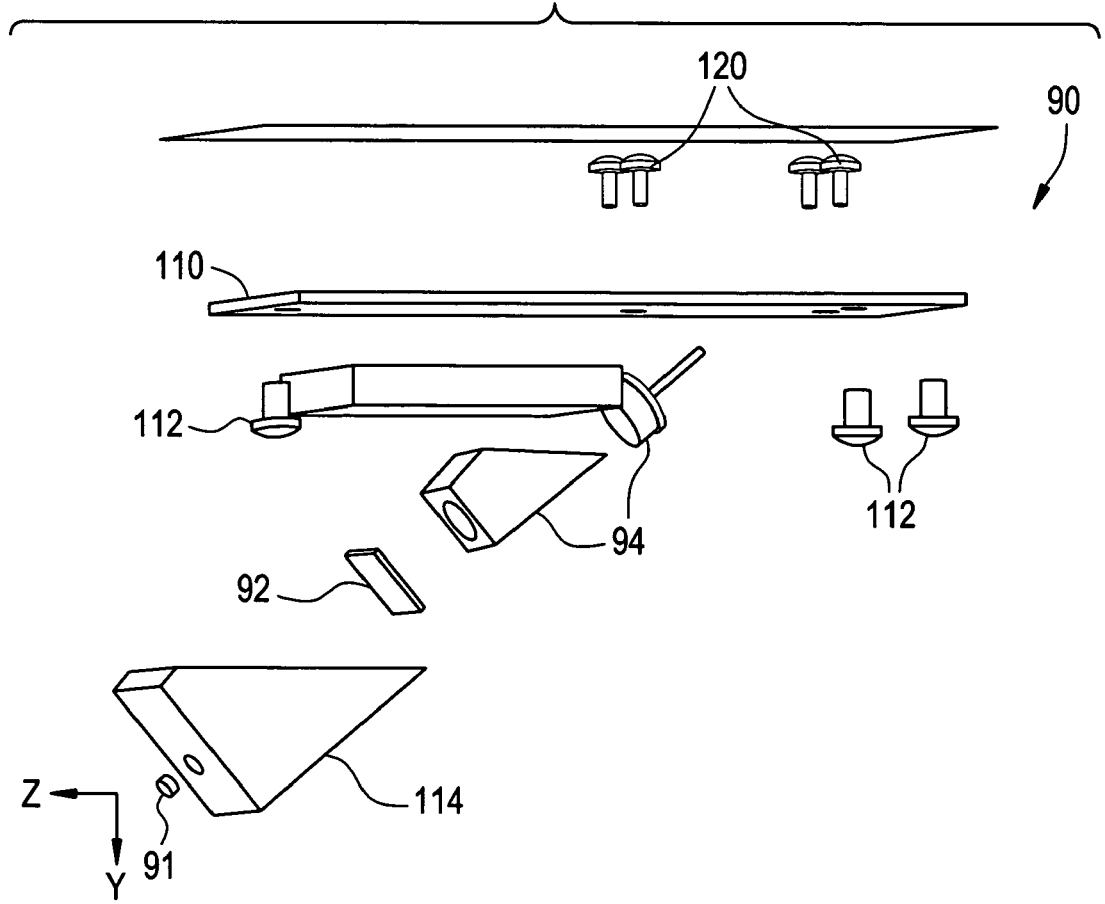
FIG. 10 is an exploded view of the light intensity sensor of FIG. 9.

In an exemplary embodiment, photodiode 94 is configured to be in electrical communication with the microcontroller and related circuitry for receipt of and comparison of the signals provided by photodiode 94. As illustrated in FIGS. 9 and 10 microcontroller 98 and its related electronic circuitry is housed within a housing 124 mounted proximate to housing 114.

Non-limiting examples of a photodiode and lens contemplated for use in exemplary embodiments of the present invention are an OP913WSL photodiode from Optek Technology Incorporated and a Tech Spec™ Double-Convex Lenses (DCX) lens obtained from Edmund Optics (stock number NT31-858). Of course, other types of photodiodes and lens are contemplated to be used in exemplary embodiments of the present invention.

It is noted that the configurations and mounting arrangements illustrated in FIGS. 9 through 12 are merely provided as examples of contemplated methods for mounting and the present invention is not intended to be limited to be specific configurations illustrated.

Figure 13:
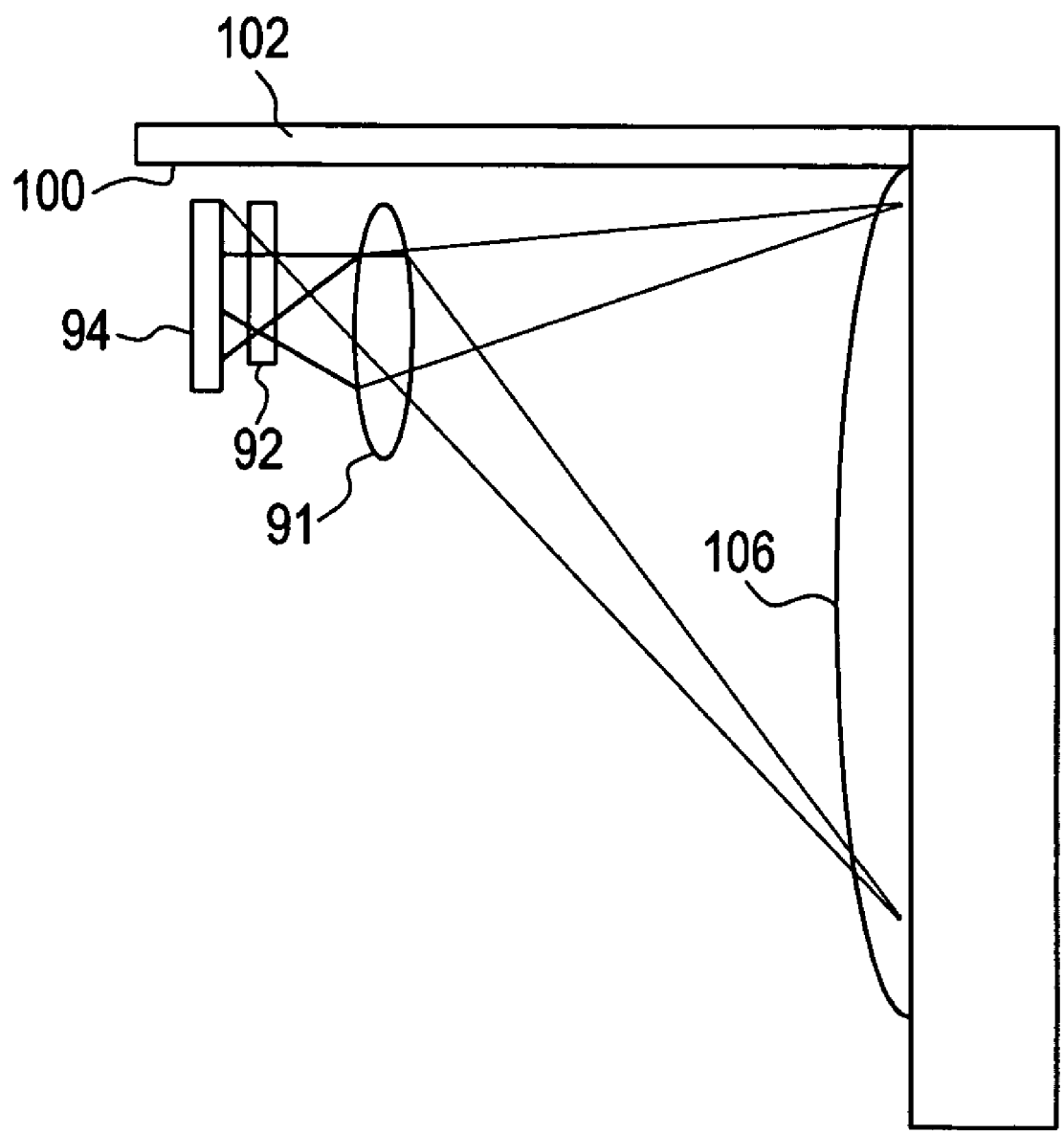
FIG. 13 is a schematic illustration of an exemplary embodiment of the present invention.

Referring now to FIG. 13, a schematic illustration of the operation of the photo detector is illustrated. As discussed above, a lens 91 is aimed or positioned to be directed towards a center portion of the roundel 106. Lens 91 forms an image of the roundel that is inverted and slightly compressed at the back focal plane of the lens due to its angular orientation with respect to the roundel 106. Due to the location of the lens with respect to the face of the roundel 106 there is a decrease in intensity as $1/r^2$, wherein "r" is the radius of the radial distance to any point on the roundel lens from the detector housing, more specifically the down the center of the roundel from the detector housing. In other words the lens is further away from the bottom of the roundel as opposed to the top thus, for example with the photo detector or lens approximately 8 inches away from the top of a roundel having a diameter of approximately 12 inches there is 6.2× drop in intensity due to the geometry. Therefore, the light intensity is proportional to the cosine of the angles. See for example the graphs of FIG. 5. Thus, the angle of the surface normal to the lens face with respect to the optical axis leads to decreased intensity proportional to the cosine of the surface normal relative to the optical axis. Therefore, the angle between the optical axis of the detector and a point on the lens causes a drop off proportional to the cosine of the angle. For example, and for the photo detector spaced 8 inches away from the lens the relative sensitivity is approximately 16.75× less along the vertical extent of the roundel. Therefore, once the light output is provided to filter 92 by lens 91 the filter needs to be configured to provide attenuation corresponding to the disparity between the light output received from the top of the roundel as opposed to the bottom. For example, the majority of light received by the photo detector comes from the top of the roundel and in applications wherein an incandescent lamp is used the areas where the lamp's filament is located (e.g., typically in the center of the roundel).

Therefore filter 92 is configured to provide an attenuation that is proportional to the brightness of the image provided by lens 91. Accordingly, an area selective attenuator is provided to create a uniform light output to the photodiode. In other words higher intensity areas are filtered out to equalize the overall transmittance to provide a uniform output to the photodiode.

An example of a method for providing filter 92 comprises taking an image of the light output received by lens 91 with a digital camera in order to determine the bright spots or areas of high intensity that will require attenuation from filter 92. Accordingly, the digital image provided is similar to that of the light output that is to be filtered by filter 92.

Figure 14:
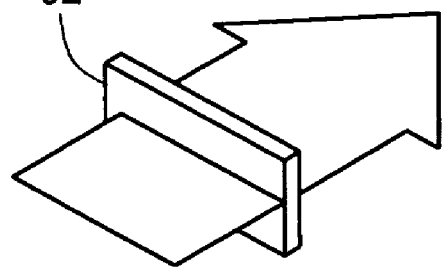
FIGS. 14–15 illustrate optical filters for use in exemplary embodiments of the present invention.
Figure 14:
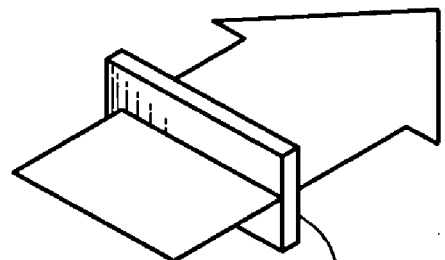
Figure 14:
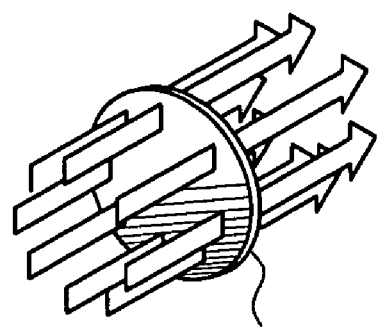
Figure 15:
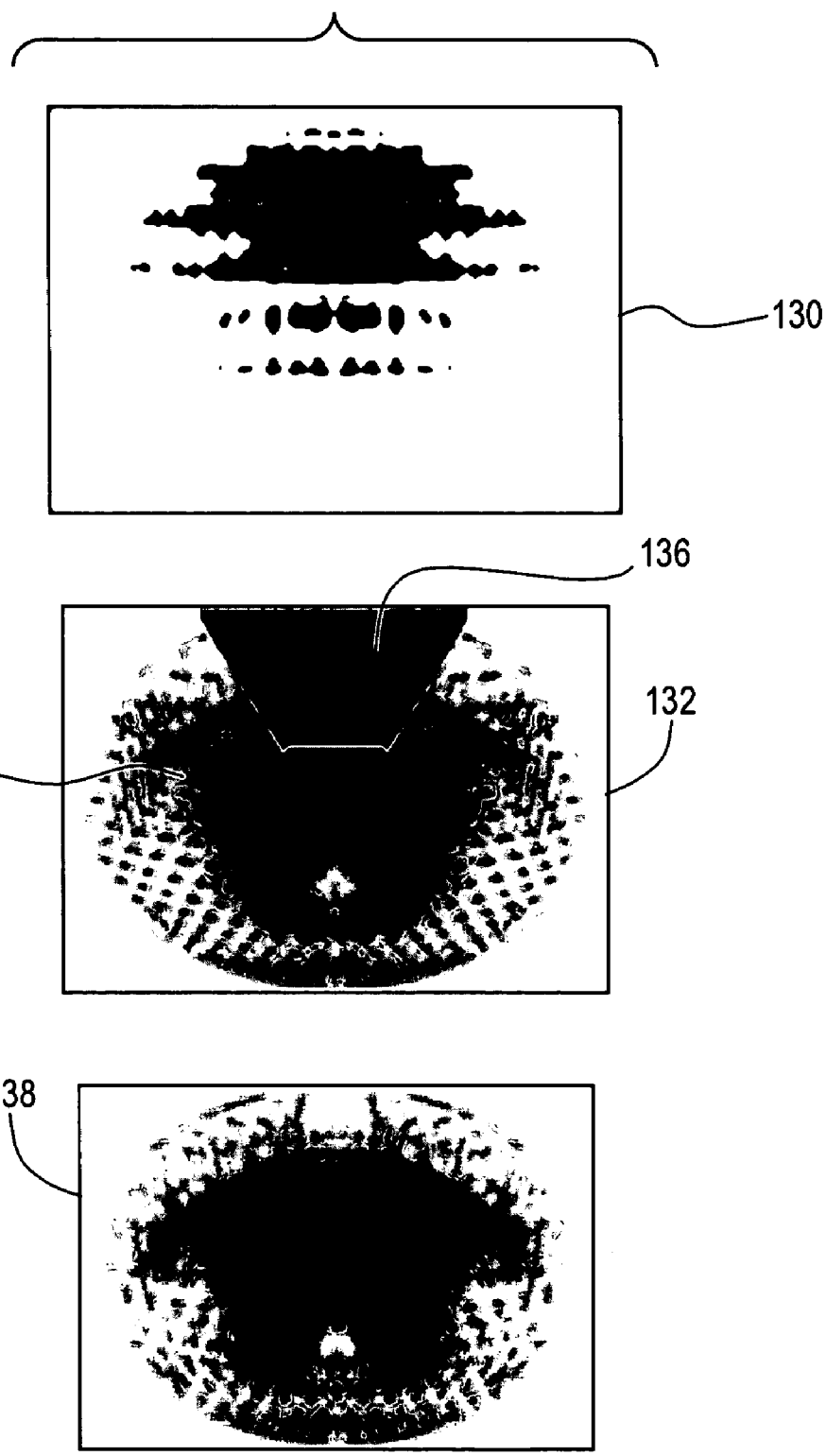

Depending upon the required attenuation, numerous optical filters can be utilized with the appropriate attenuation. Examples include stepped neutral density ND filter (e.g., filters with a flat spectral response in the visible region), fixed ND filters, linear variable filter and circular variable filters. Some non-limiting filters are illustrated in FIG. 14, which is found on pages 10–16 of the following publication; "*The Book of Photon Tools*" by Oriel Instruments. Referring now to FIG. 15 examples of digital images are shown to determine the areas of location for attenuation in filter 92. For example, image 130 shows the areas that require attenuation are primarily located at the top of the roundel thus the filter would be configured to attenuate the areas of high intensity shown in image 130. Thus, exemplary embodiments of the present invention provide a photo detector that is capable of noticing a reduced light output at lower portions of the roundel, which may have been undetectable by a photo detector without optical filtering and accordance with exemplary embodiments of the present invention as reduction and light output at the lower levels of the roundel may go unnoticed due to the disparity between the light intensity of the upper levels of the roundel.

Image 132 shows an alternative pattern for selective attenuation of the light intensity of the roundel of the warning lamp. In this image a central masking 134 is located to block out a high intensity area corresponding to the lamp location of an incandescent bulb of the warning light. In addition, an area 136 is provided to provide selective attenuation of high intensity areas in close proximity to the photo detector. Other alternatives would contemplate selective attenuation for prisms created by the plastic material of the lens or roundel 106 of the warning light. This is particularly useful in LED lamps wherein a plurality of rows of LEDs are used to illuminate the lamp face.

Image 138 illustrates areas of high intensity of an incandescent lamp disposed behind a lens or roundel of the warning light wherein darker areas illustrate areas of high intensity that require attenuation by the optical filter. It is, of course, understood that numerous filtering configurations are contemplated for providing the selective attenuation of optical filter 92.

In accordance with exemplary embodiments of the present invention contemplated materials for providing optical filter 92 include but are not limited to the following: chrome-on-glass high optical filters, half tone filters, continuous tone filters and equivalents thereof wherein the filter is capable of attenuating fractional areas of the light output received. In other embodiments, photographic film is positioned on the optical filter or lithography is used to provide the filter pattern with selective attenuation.

Thus, a variable density filter 92 is provided for use and optical sensor for a railroad warning light. The density of the filter in one exemplary embodiment is designed to compensate for variation in incident irradiance from top to bottom.

In accordance with in an exemplary embodiment, a concentrating optic yields an intermediate image plane where the amount of light passing to the photo detector can be adjusted to compensate for the geometry of the roundel. The concentrating optic forms an image of the roundel surface on a single, centrally located photo detector. At the face of the photo detector a variable transmission density filter is located which attenuates the light from the top relative to the bottom as well as side to side of the roundel surface.

In an alternative exemplary embodiment, a pair of photo detectors are positioned at the left and right edges of the hood allowing for a smaller range of transmittance corrections to be utilized. This embodiment will provide improved sensitivity however it also requires two symmetrically placed photo detector/lens assemblies wherein the outputs are summed for comparison.

In summation, a sensor for monitoring the output irradiance of a railroad crossing flashing light that provides a spatially uniform response is disclosed herein. Uniform response will enable blockages occurring anywhere on the lamp roundel surface to be detected. In addition, a uniform response also affords same reduction for a given lamp roundel blockage independent of the location of the blockage on the lamp roundel surface. A uniform response in accordance with an exemplary embodiment can be obtained by a single sensor positioned under the hood and aligned at the center of the lamp roundel. An optical system consisting of lens and a spatially variable transmittance filter serve to form an image of the lamp roundel and attenuate areas of high intensity.

Exemplary embodiments of the present invention also teach a system and method for deploying a light sensor which provides a uniform response relative to the spatial extent of the lamp roundel. Such a light sensor system allows for monitoring of the lamp visibility during each activation of the crossing warning system. Such a light sensor is mounted external to the flashing light head in order to capture the effects of lens damage, accumulated dirt and debris on the lens in addition to failure of the optical light source (bulb or LED array).

In order to increase the uniformity of the externally mounted light sensor response to blockages of the lamp roundel, an optical system was designed to form an image of the roundel at the image plane of a 3.0 mm focal length lens. A compensating filter with spatially variable transmittance is placed at the image plane to allow for the reduction of the intensity at the bright locations of the lamp roundel while allowing for higher transmittance at the areas of lower brightness.

Areas of high intensity result from geometric factors which cause the intensity received at the bottom of the lens to be reduced by approximately 16 times the levels received from the top of the lens surface. In addition, lamps using incandescent bulb sources contribute a bright spot due to the location of the filament. By generating a filter with variable transmittance based on measured lamp intensity distribution as seen by the detector, the overall system response can be made uniform within a desired tolerance.

The compensating filter characteristics are obtained by characterizing the spatial intensity distribution for a given lamp type with a digital image sensor and a camera objective lens of equivalent field of view as seen by the sensor. The two dimensional image of lamp roundel intensity from the camera is inverted as in a photographic negative such that areas of high intensity become areas of high attenuation (low transmittance) in the compensation filter. The negative image is then smoothed (for example via a 9 point moving average operation or filter) to reduce the system sensitivity to mounting alignment of the sensor relative to the lamp center.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An operational status detection system for a railroad warning device having a warning light, comprising:
   a photo detector configured to generate a signal corresponding to a light output of the warning light of the railroad warning device, said photo detector comprising a lens, an optical filter and a photodiode, wherein said optical filter is disposed between said photodiode and said lens and said optical filter is configured to provide the light output of the warning light received by said lens to be presented as a substantially uniform spatial response to said photodiode wherein areas of high intensity of the warning light that are received by the lens are attenuated, said areas of high intensity providing higher light outputs than other areas of the warning light; and
   a microcontroller receptive to said signal, wherein said microcontroller compares said signal to at least one threshold value, said at least one threshold value corresponding to an acceptable light output of the warning light.

2. The operational status detection system of claim 1, wherein said signal is an analog signal and said microcontroller further comprises an analog-to-digital converter for converting said output signal into a digital signal.

3. The operational status detection system of claim 1, further comprising another optical filter which limits radiation received by the photodiode to a set of wavelengths corresponding to a color of the warning light, wherein the set of wavelengths is in the range of about 380–780 nanometers.

4. The operational status detection system of claim 3, wherein the set of wavelengths is in the range of about 650–780 nanometers.

5. The operational status detection system of claim 1, wherein said microcontroller provides an operational status signal to a remote monitoring system, wherein said operational status signal indicates whether the light output of the warning light is below an acceptable level.

6. The operational status detection system of claim 1, wherein said microcontroller provides an operational status signal to a remote monitoring system, wherein said operational status signal indicates whether the light output of the warning light is outside a range corresponding to an acceptable level of light, said range defining an upper limit and a lower limit of said acceptable level of light.

7. The operational status detection system of claim 1, wherein the warning light is a flashing warning light.

8. The operational status detection system of claim 1, wherein the warning light comprises an incandescent light source.

9. The operational status detection system of claim 1, wherein the warning light comprises an array of light emitting diodes (LEDs).

10. The operational status detection system of claim 1, wherein said photo detector is offset from a central portion of the warning light and said lens is aligned with said central portion of the warning light such that the light output of the warning light is received by said lens in an angular configuration.

11. The operational status detection system of claim 1, wherein said lens inverts an image of the light output of the warning light and the image is compressed at a back focal plane of said lens in order to accommodate an angle the light output is received by said lens.

12. An operational status detection system for a railroad warning device having a warning light, comprising:
a plurality of photo detectors each being configured to generate a signal corresponding to a light output of the warning light of the railroad warning device, each of said plurality of photo detectors comprising a lens, an optical filter and a photodiode, wherein said optical filter is disposed between said photodiode and said lens and said optical filter is configured to provide the light output of the warning light to be presented as a substantially uniform spatial response to said photodiode wherein areas of high intensity of the warning light that are received by the lens are attenuated, said areas of high intensity providing higher light outputs than other areas of the warning light; and
a microcontroller for receiving each signal generated by said plurality of photo detectors, wherein said microcontroller compares each signal to at least one threshold value, said at least one threshold value corresponding to an acceptable light output of the warning light.

13. The operational status detection system of claim 12, wherein said microcontroller provides an operational status signal to a remote monitoring system, wherein said operational status signal indicates whether the light output of the warning light is outside a predetermined range of acceptable light levels.

14. The operational status detection system of claim 12, further comprising another optical filter for each of said plurality of photo detectors, wherein said another optical filter is configured to limit radiation received by each of said plurality of photodiodes to a set of wavelengths corresponding to the color of the warning light, wherein the set of wavelengths is in the range of about 380–780 nanometers.

15. The operational status detection system of claim 14, wherein the set of wavelengths is in the range of about 650–780 nanometers.

16. A method for remotely monitoring a light output of a warning light of a railroad crossing warning system, comprising:
inverting and compressing an image of the light output with a lens offset from a central portion of the warning light;
filtering the image provided by the lens with an optical filter, wherein the optical filter is configured to selectively attenuate the image to provide a filtered light output by selectively blocking areas of high intensity of the warning light, said areas of high intensity providing a greater light output than other areas of the warning light;
sampling the filtered light output with a photodiode, the photodiode generating a signal indicative of a light intensity of the filtered light output;
comparing the signal to an acceptable threshold value to generate an operational status signal; and
providing said operational status signal to a remote monitoring system.

17. The method as in claim 16, further comprising the step of eliminating undesired wavelengths of light sampled by the photodiode in order to let only those wavelengths corresponding to a color of the warning light to pass through to said photodiode.

18. A warning light for a railroad crossing, comprising:
a housing for a light emitting device;
a roundel secured to said housing, said roundel being positioned in front of said light emitting device to provide an illuminated surface of the warning light;
a shroud extending from said housing and said roundel;
a photo detector secured to said shroud and being positioned to detect light from said illuminated surface wherein said photo detector is configured to provide an operational status signal of the warning light, said photo detector comprising;
a lens, an optical filter and a photodiode, wherein said optical filter is disposed between said photodiode and said lens and said optical filter is configured to provide a light output of the warning light to be presented as a substantially uniform spatial response to said photodiode wherein areas of high intensity of the warning light that are received by the lens are attenuated, said areas of high intensity providing greater light output than other areas of the warning light; and
a microcontroller receptive to said signal, wherein said microcontroller compares said signal to at least one threshold value, said at least one threshold value corresponding to an acceptable light output of the warning light.

19. The warning light as in claim 18, wherein said microcontroller provides an operational status signal to a remote monitoring system, wherein said operational status signal indicates whether the light output of the warning light is below an acceptable level.

20. The warning light as in claim 18, wherein said microcontroller provides an operational status signal to a remote monitoring system, wherein said operational status signal indicates whether the light output of the warning light exceeds an acceptable level.

21. The warning light as in claim 18, further comprising an optical wavelength filter positioned to filter radiation received by said photodiode, said optical filter limits radiation received by the photodiode to a set of wavelengths corresponding to the color of said illuminated surface, wherein the set of wavelengths is in the range of about 380–780 nanometers.

22. The warning light as in claim 21, wherein the set of wavelengths is in the range of about 650–780 nanometers.

* * * * *